United States Patent [19]

Yamamoto

[11] Patent Number: 5,512,804
[45] Date of Patent: Apr. 30, 1996

[54] DYNAMIC FOCUS CIRCUIT OF ELECTROMAGNETIC FOCUSING TYPE FOR CATHODE RAY TUBE OF VIDEO IMAGE DISPLAYING APPARATUS

[75] Inventor: Katsunori Yamamoto, Tokyo, Japan

[73] Assignee: Pioneer Electronic Corporation, Tokyo, Japan

[21] Appl. No.: 303,155

[22] Filed: Sep. 8, 1994

[30] Foreign Application Priority Data

Sep. 9, 1993 [JP] Japan ..................... 5-224807

[51] Int. Cl.$^6$ ..................................... G09G 1/04
[52] U.S. Cl. ..................................... 315/382.1
[58] Field of Search ..................... 313/361.1, 382, 313/414, 415; 315/370, 382, 384, 385, 387, 399, 400, 382.1, 389; 358/829, 830

[56] References Cited

U.S. PATENT DOCUMENTS

| | | | |
|---|---|---|---|
| 3,177,396 | 4/1962 | Brooks | 315/382.1 |
| 4,460,851 | 7/1984 | Bistline et al. | 315/408 |
| 4,644,230 | 2/1987 | Federle | 315/382 |
| 4,795,946 | 1/1989 | Nishiyama | 315/370 |
| 5,179,322 | 1/1993 | Gibbs | 315/370 |
| 5,283,505 | 2/1994 | Bando | 315/387 |
| 5,381,079 | 1/1995 | Perreault | 315/382 |
| 5,455,492 | 10/1995 | Turnbull | 315/382 |

Primary Examiner—Scott A. Rogers
Assistant Examiner—Jerome Grant, II
Attorney, Agent, or Firm—Young & Thompson

[57] ABSTRACT

A dynamic focus circuit of electromagnetic focusing type for a cathode ray tube of a video image displaying apparatus, is provided with a first oscillating circuit and a second oscillating circuit. The first oscillating circuit is provided with: an electric power source; a first switching device; and a capacitor, which are connected in series to form a loop, the first oscillating circuit being opened and closed by the first switching device. The second oscillating circuit is provided with: a second switching device; the capacitor, which is commonly used with the first oscillating circuit such that the first and second oscillating circuits are parallel with respect to the capacitor; and a focus coil for focusing an electron beam of the cathode ray tube, the second switching device, the capacitor and the focus coil being connected in series to form a loop, the second oscillating circuit being opened and closed by the second switching device. The first switching device opens and closes at a timing in correspondence with a blanking time period or a video image time period based on a horizontal scanning frequency of video image data of the video image displaying apparatus, to charge and discharge the capacitor. The second switching device opens and closes at a timing according to an inverse logic of the first switching device, to charge and discharge the capacitor.

12 Claims, 9 Drawing Sheets

DYNAMIC FOCUS CIRCUIT OF ELECTROMAGNETIC FOCUSING TYPE FOR CATHODE RAY TUBE OF VIDEO IMAGE DISPLAYING APPARATUS

BACKGROUND OF THE INVENTION

1. Field of the Invention

The present invention generally relates to a dynamic focus circuit of a display apparatus, and more particularly to a dynamic focus circuit of electromagnetic focusing type, which is used for a CRT (Cathode Ray Tube) of a projection television etc.

2. Description of the Related Art

The multi-media and the projection television are being popularized, by which a video image can be enjoyed at home on a wide picture plane with force. In order to display a video image source of high quality such as a high definition television, a clear vision etc., and display the character information and the drawing information in the multi-media, there is a tendency that the picture plane is getting larger and the resolution is getting higher. On such a background, it is demanded to improve the focusing capability in view of improving the image quality on the overall picture plane.

In the projection television, the video image of the CRT is magnified and projected by use of a projection lens. The focusing technique by means of a main focusing lens, is such a technique to focus an electron beam emitted from an electron gun to a smallest spot on a fluorescent surface of the CRT and on the screen, at this time.

There are two types of focusing method, i.e. an electrostatic focusing method, which adjusts focusing by adjusting the application of the voltage by combining the cylindrical electrodes within the CRT, and an electromagnetic focusing type focusing method (hereinbelow, it is referred to as an electromagnetic focusing method) which uses a focusing coil and the permanent magneto at the external of the CRT. The electromagnetic focusing method can perform such a control to make the spot diameter smaller than the electrostatic method, so that the electromagnetic focusing method is suitable for the high image quality projection television.

FIG. 7 shows a principle of the electromagnetic focusing method.

FIG. 7 shows a CRT 12 and a screen 11. The CRT 12 projects a video image onto the screen 11. A focus coil L1 for generating a correction magnetic field, and a permanent magneto 13 for generating a stationary magnetic field are equipped at a neck portion 12b of the CRT 12. An electron gun 14 is provided in the internal space of the CRT 12. An electron beam 15 is emitted from the electron gun 14.

At the central portion of a fluorescent surface 12a, the electron beam 15 is focused with a focal distance L from the electron gun 14 to the fluorescent surface 12a. At the peripheral portion of the fluorescent surface 12a, the electron beam 15 is deflected and is focused with the distance L'. In the figure, a curved plane is indicated by a broken line, which distance from the electron gun 14 is equal to the focal distance L of the central portion of the fluorescent surface 12a. At the peripheral portion, since the traveling distance of the electron beam 15 is the distance L', which is longer than the focal distance L, such a condition occurs where the focusing condition is slightly lost and the spot shape becomes oval shape. Therefore, there is required a technique to obtain the optimum spot condition. This can be achieved by changing the current flowing through the focus coil L1 of the CRT 12 in a parabola manner in correspondence with the deflecting current. This technique is a so called dynamic focusing method.

Some examples of the electromagnetic focusing type dynamic focus circuit are explained here with referring to FIG. 8 and FIG. 9.

FIG. 8a shows a driving circuit of the dynamic focus circuit of electromagnetic focusing type by means of a constant current amplifier. FIG. 8b shows the current I and the voltage V of the constant current amplifier, wherein they are called parabola wave because of their shape. The voltage VW for focusing, which is generated by a waveform generator 16, is amplified in current through a preamplifier 8 by an output constant current amplifier 17 for current driving, and is applied to a focus coil L. The voltage generated by a detection resistor RL for current-voltage waveform feed back loop, is compared with the input voltage VW by the preamplifier 8, to control the output constant current amplifier 17. By this, a current IL which is flowing through the focus coil L, becomes the parabola waveform as shown in FIG. 8b.

FIG. 9a shows a construction of the dynamic focus circuit of electromagnetic focusing type by means of a PWM (Pulse Width Modulation) method. FIG. 9b shows a signal waveform of each portion of the dynamic focus circuit of FIG. 9a.

The current waveform obtained by a detection resistor RL for current-voltage waveform feed back loop, is compared with the horizontal parabola wave of the voltage VW as shown in FIG. 9b, which is generated by the standard waveform generator 16, by an error amplifier 8a. The error amplifier 8 generates an error signal. The carrier component included in this error signal is removed at a low pass filter (LPF) 20, and is inputted to a comparator 19 as the error signal VE. If the voltage VW is a parabola wave, the error signal VE becomes a sawtooth wave. By constructing a general PWM generating means by a standard oscillator 18 and the comparator 19, a PWM signal VP is generated from the error signal VE. Then, the amplifier 17 is driven by the PWM signal VP, the parabola wave current $L_{l1}$ can be supplied to the focus coil L1.

Other than the above explained examples, there are several dynamic focusing circuits of the electromagnetic focusing type. For example, each of Japanese Patent Laid Open Hei.3-53,671 (1991), Japanese Patent Laid Open Hei.4-271,695 (1992), Japanese Patent Laid Open Hei.4-70,181 (1992) and Japanese Patent Laid Open Hei.5-37,799 (1993), discloses a dynamic focus circuit.

However, the above explained dynamic focus circuit by means of the constant current amplifier has a problem that the electric power consumption is high. Namely, most of the electric power supplied from the electric source is consumed by the constant current output circuit. The electric power is as much as 70 to 80 [Watt] in general, so that the heat generated by this consumed electric power causes an economical problem, a problem to give the room for the heat generation in the apparatus, and a problem that the increase of the power consumption of the overall television apparatus is greatly affected. For example, since the overall power consumption of the projection television is in a range from 180 to 260 [Watt] in general, as the power consumption of only one control circuit with respect to this figure, the load of the power consumption is too heavy.

Further, in the above explained dynamic focus circuit of the PWM type, the problem of the power consumption can be improved to some degree, by employing the switching method for the current application by the constant current amplifier. However, in this case, since the current flows through the focus coil by the switching operation of several tens times of the horizontal synchronization frequency, a drawback such as an unnecessary irradiation etc., is caused by the switching noise.

On the other hand, there is a multi-sync display to display images which correspond to the standards of various computers. This multi-sync display is a display which can vary the horizontal scanning frequency $f_H$ in a range from about 15 KHZ to more than 75 KHz. Here, the power consumption and the unnecessary irradiation are greatly related to the horizontal scanning frequency $f_H$. Thus, in order to adapt the above mentioned dynamic focus circuit of electromagnetic focusing type to the multi-scanning operation of the multi-sync display, the reduction of the power consumption and the reduction of the unnecessary noise generation are greatly desired.

SUMMARY OF THE INVENTION

It is therefore an object of the present invention to provide a dynamic focus circuit of electromagnetic focusing type which power consumption is small, which generation of the unnecessary noise is also small, and which can be easily applied to the multi-sync display.

The above mentioned object of the present invention can be achieved by a dynamic focus circuit of electromagnetic focusing type for a cathode ray tube of a video image displaying apparatus, provided with a first oscillating circuit and a second oscillating circuit. The first oscillating circuit is provided with: an electric power source; a first switching device; and a capacitor, which are connected in series to form a loop, the first oscillating circuit being opened and closed by the first switching device. The second oscillating circuit is provided with: a second switching device; the capacitor, which is commonly used with the first oscillating circuit such that the first and second oscillating circuits are parallel with respect to the capacitor; and a focus coil for focusing an electron beam of the cathode ray tube. The second switching device, the capacitor and the focus coil are connected in series to form a loop. The second oscillating circuit is opened and closed by the second switching device. The first switching device opens and closes at a timing in correspondence with a blanking time period or a video image time period based on a horizontal scanning frequency of video image data of the video image displaying apparatus, to charge and discharge the capacitor. The second switching device opens and closes at a timing according to an inverse logic of the first switching device, to charge and discharge the capacitor.

In the operation of the dynamic focus circuit of the present invention, firstly, the first switching device closes the first oscillating circuit during the blanking time period or the video image time period. At the same time, the second switching device opens the second oscillating circuit. Thus, the electric charges are charged in the capacitor from the electric power source. Nextly, the first switching device opens the first oscillating circuit, and at the same time, the second switching device closes the second oscillating circuit, so that the oscillation is generated by the time constant belonging to the closed loop of the second oscillating circuit, and that the sine wave current flows in the second oscillating circuit.

Here, the waveform of this sine wave current resembles the parabola waveform in its characteristic curve, which is used in the conventional dynamic focus circuit. Thus, by employing the focus coil connected in the loop of the second oscillating circuit to focus the electron beam of the CRT, the dynamic focus circuit can be realized by use of a simple circuit.

The nature, utility, and further features of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Referring to the accompanying drawings, an embodiment of the present invention will be now explained.

First Embodiment

The first example is a basic circuit to vary the oscillating frequency by use of a saturable reactor without employing a feed back by an error amplifier.

Figure 1:
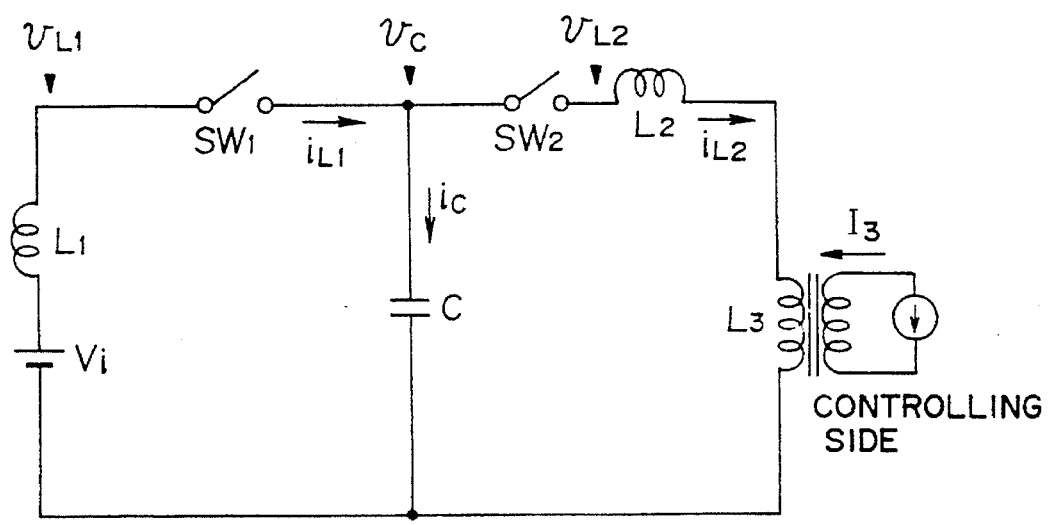
FIG. 1 is a circuit diagram of a dynamic focus circuit as a first embodiment of the present invention.

FIG. 1 shows a construction of a dynamic focus circuit of the first embodiment.

In FIG. 1, the dynamic focus circuit is provided with a first oscillating circuit and a second oscillating circuit, which use one capacitor in common for oscillation and which are connected in parallel with respect to the capacitor.

The first oscillating circuit is provided with an electric power source Vi, a coil L1 and a switch SW1, which are connected in series with the capacitor C. By closing the switch SW1, the first oscillating circuit becomes a closed loop to operate.

The second oscillating circuit is provided with a switch SW2, a focus coil L2 and a coil L3, which are connected in series with the capacitor C for oscillation as the common constitutional element with the first oscillating circuit. By closing the switch SW2, the second oscillating circuit becomes a closed loop to operate.

The switch SW1 and the switch SW2 can be opened and closed independently from each other. The switches SW1 and SW2, may consist of electrically operated switches such as a thyristor (SCR), a FET (Field Effect Transistor) etc.

Figure 2:
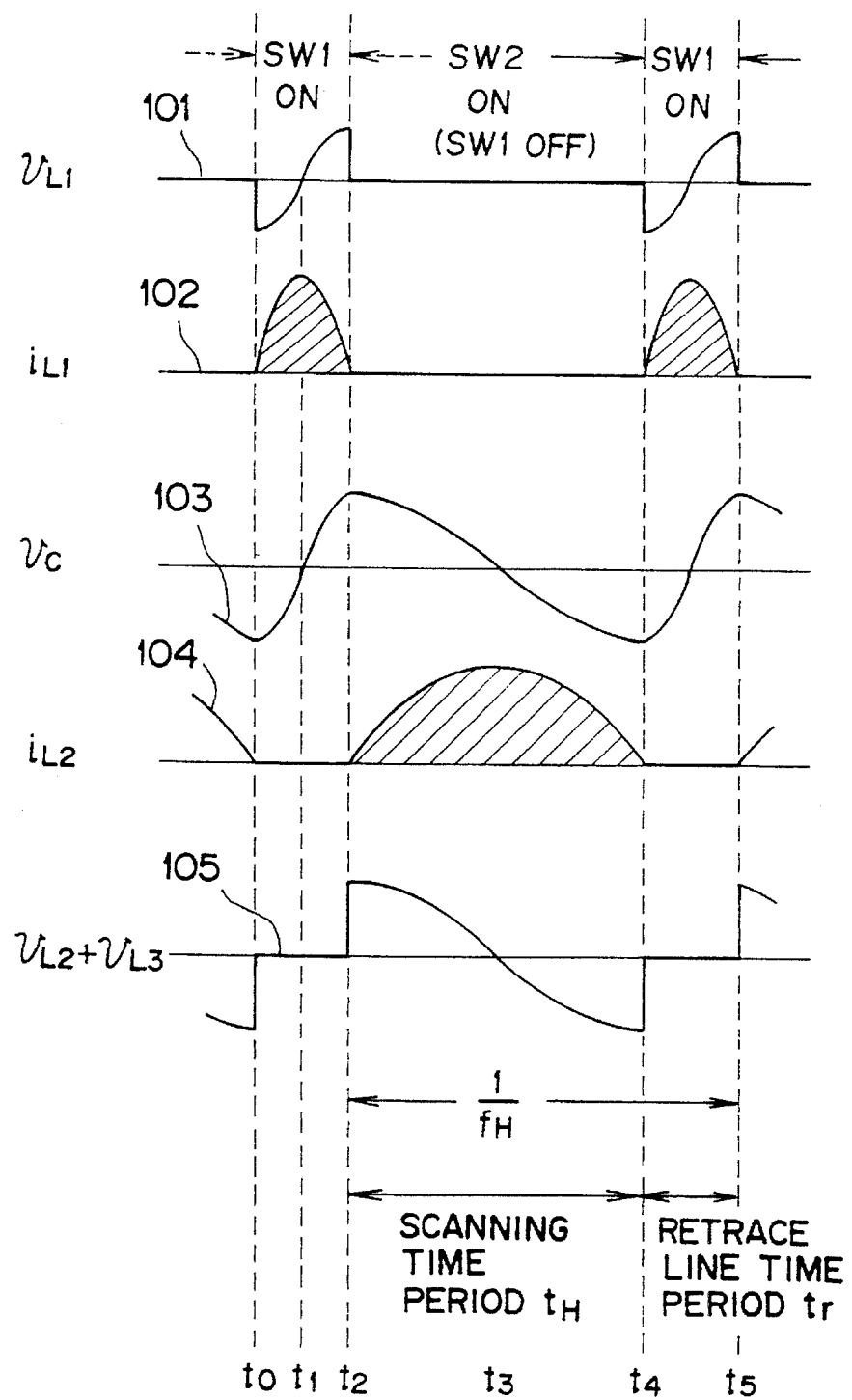
FIG. 2 is a waveform diagram showing a waveform at each portion of the first embodiment.

Nextly, the operation of the first embodiment is explained with referring to FIG. 2, which is a waveform diagram.

Firstly, when the switch SW1 is closed (at a time t0), electric current $i_{L1}$ starts to flow to the capacitor C through the coil L1, and charging is started, as indicated by a curve 102 of FIG. 2. Voltage $v_{L1}$ appearing at the coil L1 at this time, is indicated by a curve 101 of FIG. 2. Nextly, when the switch SW1 is opened and the switch SW2 is closed at a time t2, the oscillation with the oscillating frequency expressed by a following expression (1) is started in the loop consisting of the capacitor C, the switch SW2, the focus coil L2 and the coil L3.

$$f_H = 1/(2\pi(C(L2+L3))^{1/2}) \quad (1)$$

As the current $i_{L2}$ flows as indicated by a curve 104 of FIG. 2, the voltage vc for the capacitor C changes as indicated by a curve 103 of FIG. 2, so that the voltage vc becomes negative after a half cycle time ts of the sine wave i.e. at a time t3.

At the time t4, the switch SW2 is opened, and the switch SW 1 is closed again. In this turn, since a minus potential exists at the capacitor C, the oscillation is started with the oscillating frequency expressed by a following expression (2), by the coil L1 and the capacitor C.

$$fr = 1/(2\pi(C \times L1)^{1/2}) \quad (2)$$

The voltage vc of the capacitor C is changed from the minus value to the plus value. When the voltage vc arrives at the peak value (at a time t5), the switch SW1 is opened and the switch SW2 is closed again.

After that, the above explained processes are repeated.

Figure 3:
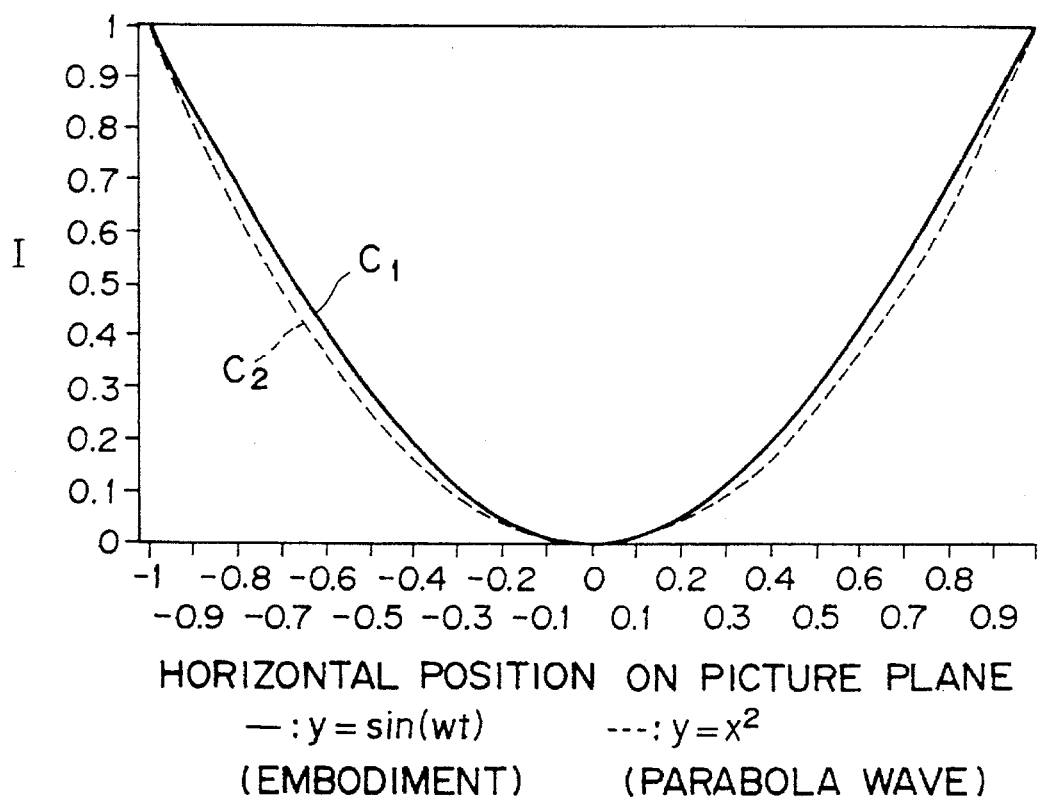
FIG. 3 is a graph showing an electromagnetic characteristic of the first embodiment.

In this manner, the current $i_{L2}$, which is supplied to the focus coil L2, is a sine wave having the oscillating waveform. Here, FIG. 3 shows how this sine wave (which is expressed by y=Sin(wt)) resembles the parabola wave (which is expressed by $y=x^2$), which is used in the conventional dynamic focus circuit, in the characteristic curve. In FIG. 3, the x axis represents the displacement from the screen center, and the vertical axis represents the current value (I) in the coil, in which a curve C1 of the sine wave in the embodiment and a curve C2 of the parabola wave, are indicated. From FIG. 3, those two curves C1 and C2 are quite similar to each other, and it is indicated that the sine wave of the embodiment can be the substitution for the parabola wave.

In order to realize the multi-sync display, it is necessary to vary the oscillating frequency fr in the second oscillating circuit. When the oscillating frequency $f_H$ is changed, the scanning time period $t_H$ is also changed. At this time, if the capacitance of the capacitor C, the inductances of the coils L2 and L3, are not changed correspondingly, the normal oscillation cannot be obtained as can be understood from the expression (1). However, the capacitance of the capacitor C should be fixed in order to obtain the oscillation with the coil L1 in the first oscillation circuit. Namely, the half cycle time tr (shown in FIG. 2) of the first oscillating circuit shown in FIG. 2, should be fixed to be the predetermined retrace line time period of the horizontal scan (about 4 [μsec]). Thus, the element to change the oscillating frequency $f_H$ of the second oscillating circuit should be a composite inductor (L2+L3). Consequently, since the focus coil L2 should have a fixed value of inductance, it becomes necessary to construct the coil L3 to be variable in inductance and to adjust the value of the inductance such that the half wave cycle time of the oscillating frequency coincides with the time $t_H$.

Figure 4A:
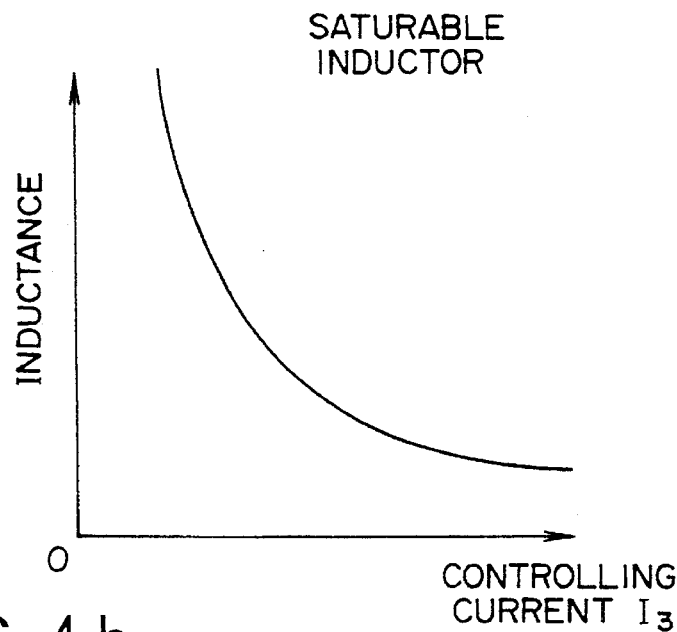
FIG. 4a and FIG. 4b, are graphs showing a characteristic of a saturable inductor used in the first embodiment.
Figure 4B:
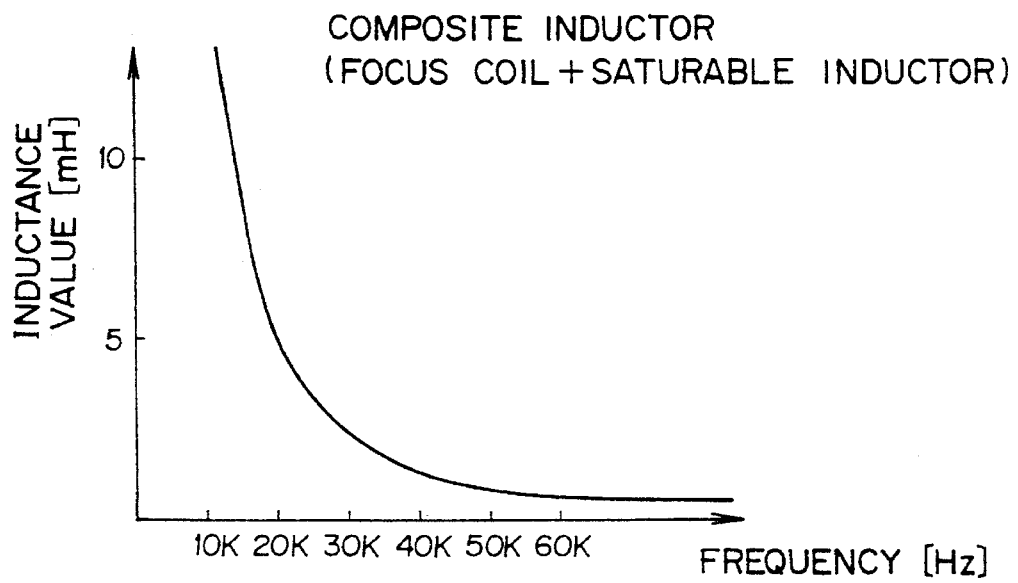

As the coil L3 of the present embodiment, a saturable inductor is employed as one kind of variable reactor. Thus, it becomes possible to vary the inductance of the coil L3 by controlling the value of a controlling current I3 flowing through the controlling side, and can freely adopt the inductance value in the range from 200 [μH] to 13 [mH] in a non-linear manner. The characteristic of this change is shown in FIG. 4a. As shown in FIG. 4a, the relationship between the controlling current I3 and the inductance of the saturable inductor i.e. the coil L3, is an inverse proportion. The inductance of the composite inductor (L2+L3) in the second oscillating circuit becomes the sum of the inductances of those coils. Thus, the multi-sync display can be constructed by setting the circuit constant of the focus coil L2 such that the oscillating frequency of the capacitor C and the focus coil L2 is not greater than the pertinent horizontal scanning frequency. For example, supposing that the ordinary horizontal scanning frequency $f_H$ is in the range between 15.75 kHz and 60 kHz, the value of L2 and the variable range of L3 are determined so as to set the value of the horizontal scanning time period $t_H$ in the range between 59.6 μm and 12.7 μm as shown in FIG. 4b. As for the case where the frequency $f_H$ is not less than 60 kHz, it can be thought in the same manner.

According to the first embodiment, since only the element for switching is used while the circuit such as the output amplifier is not used to establish the dynamic focus circuit, the electric power consumption is small. Further, since the switching operation is performed at the original horizontal scanning frequency, the generation of noise can be diminished. Further, by employing the saturable inductor, the dynamic focus circuit can be easily applied to the multi-synchronizing circuit.

Second Embodiment

In a second embodiment, the operation is performed by a switching control means which uses a thyristor element as a switch directly inserted in each oscillating circuit.

Figure 5:
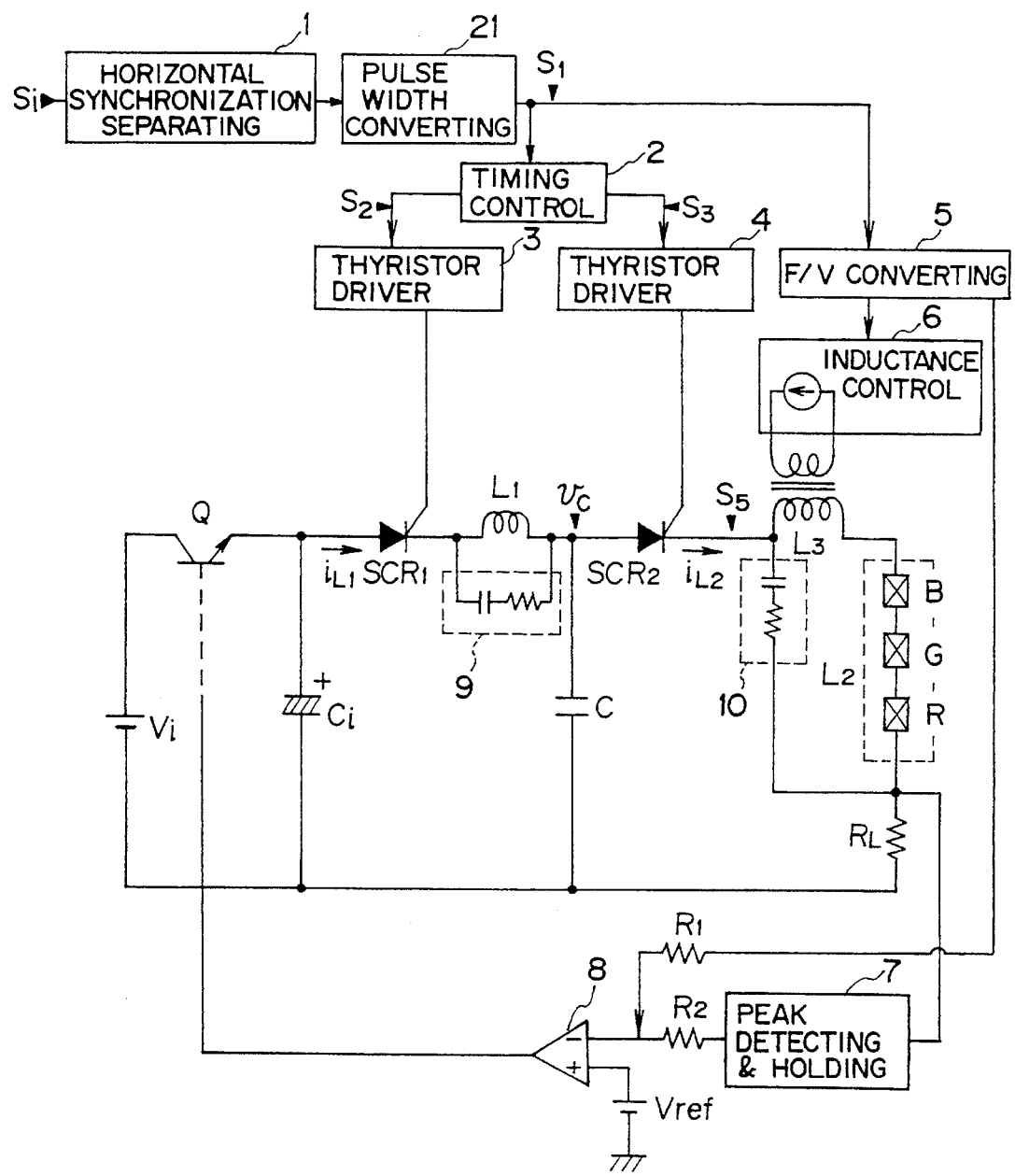
FIG. 5 is a circuit diagram of a dynamic focus circuit as a second embodiment of the present invention.

FIG. 5 shows the construction of the second embodiment.

In FIG. 5, a video signal Si is used as a standard signal. Here, the necessary portion of the video signal Si is not the composite signal portion but the horizontal synchronizing signal portion which is separated by a horizontal synchronization separating circuit 1. This horizontal synchronizing signal is supplied as a signal S1 to a timing control circuit 2 through a pulse width converting circuit 21 for generating a predetermined pulse width. The timing control circuit 2 generates timing signals S2 and S3 to turn on and off switches of the first and second oscillation circuit, and supplies the timing signals S2 and S3 to thyristor drivers 3 and 4, respectively. The thyristor drivers 3 and 4 generate drive currents for thyristors SCR1 and SCR2 for performing the switching operation, respectively.

On the other hand, the above explained horizontal synchronizing signal S1 is also supplied to a F/V (Frequency to Voltage) converting circuit 5, and is converted to a control voltage value which is synchronized with the horizontal scanning frequency of the horizontal synchronizing signal. Then, this control voltage is supplied to an inductance controlling circuit 6, which controls the inductance of the saturable reactor i.e. a coil L3, and an error amplifier 8.

Here, the basic elements of the circuit of the present embodiment, are a first oscillating circuit for charging the capacitor for oscillation and a second oscillating circuit for driving a focus coil L2.

The first oscillating circuit is constructed by an electric power source Vi, a transistor Q for modulating the electric source for voltage restriction, a capacitor Ci for smoothing, a thyristor SCR1 which is a switching element, a coil L1 to determine the oscillating frequency of the first oscillating circuit, a snubber circuit 9 connected with the coil L1 in parallel, and a capacitor C for oscillation at the center which is commonly used with the second oscillating circuit.

The second oscillating circuit is constructed by the capacitor C for oscillation, a thyristor SCR2 which is a switching element, the coil L3, the focus coil L2, a snubber circuit 10 which is connected to the coil L3 and the focus coil L2 in parallel, and a detection resistor RL for current-voltage waveform feedback loop. As for the focus coil L2, an example is shown which is constructed by connecting three focus coils of R (Red), G (Green), B (Blue) CRTs for the conventional projection television in series.

The error amplifier 8 compares: as a control input, the sum of the output through a resistor R2 from a peak detecting and holding circuit 7, which detects and holds the peak voltage of the output voltage of the detection resistor RL, and the output voltage through a resistor R1 from the F/V converting circuit 5; and a standard voltage Vref, and generates an error signal, so that it controls the transistor Q. The transistor Q is a transistor for modulating the electric source and controls the overall focusing voltage.

The inductance controlling circuit 6 outputs the controlling current for the saturable inductor on the controlling side, so that the inductance of the coil L3 (FIG. 4b) is controlled to have the time constant of the second oscillating circuit which is required at the time of the frequency corresponding to the voltage supplied from the V/F converting circuit 5. This value of the controlling current for the saturable inductor is substantially constant if the horizontal scanning frequency of a certain media is determined, as long as the horizontal scanning frequency is not changed.

Figure 6:
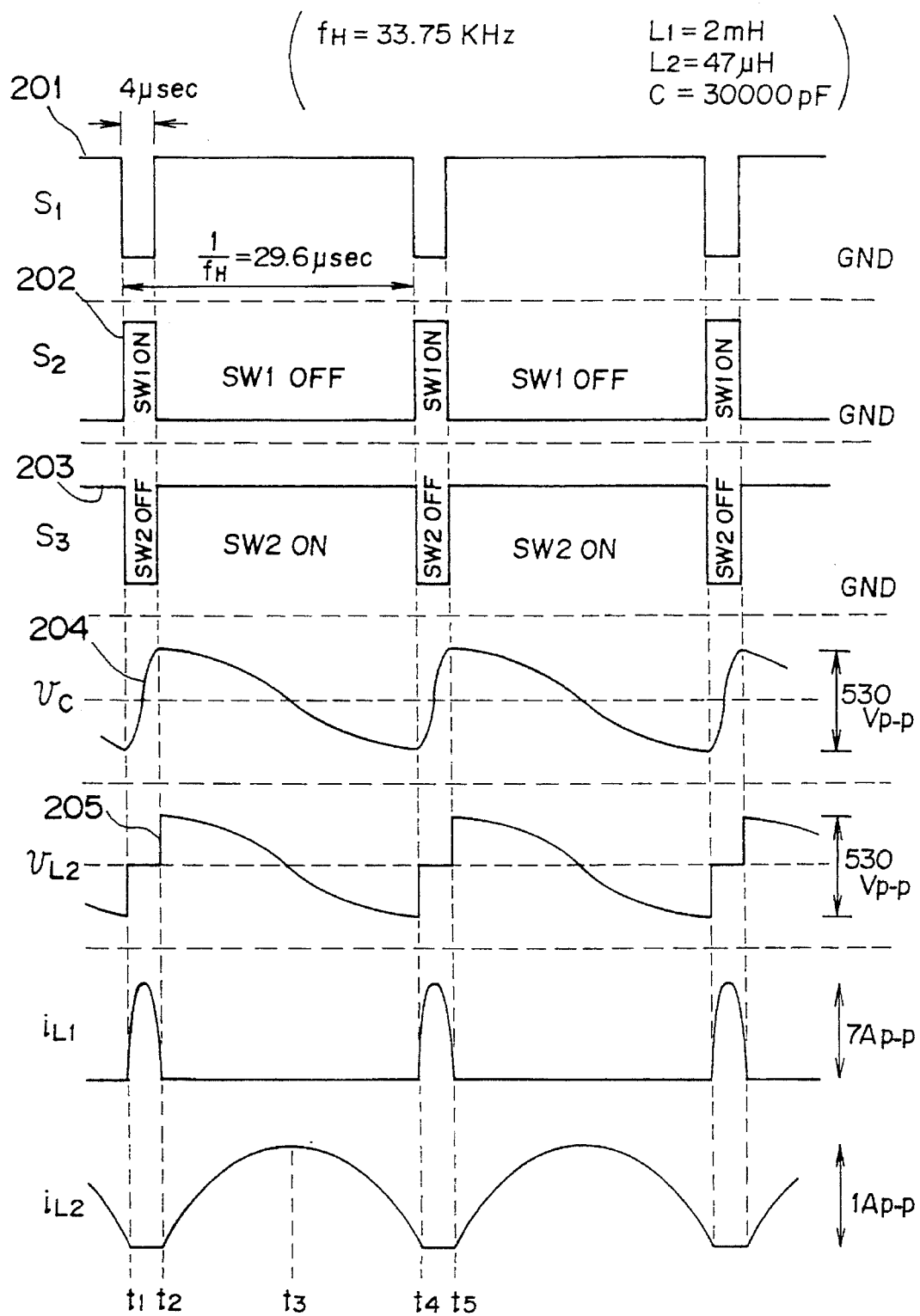
FIG. 6 is a waveform diagram showing a waveform at each portion of the second embodiment.
Figure 7:
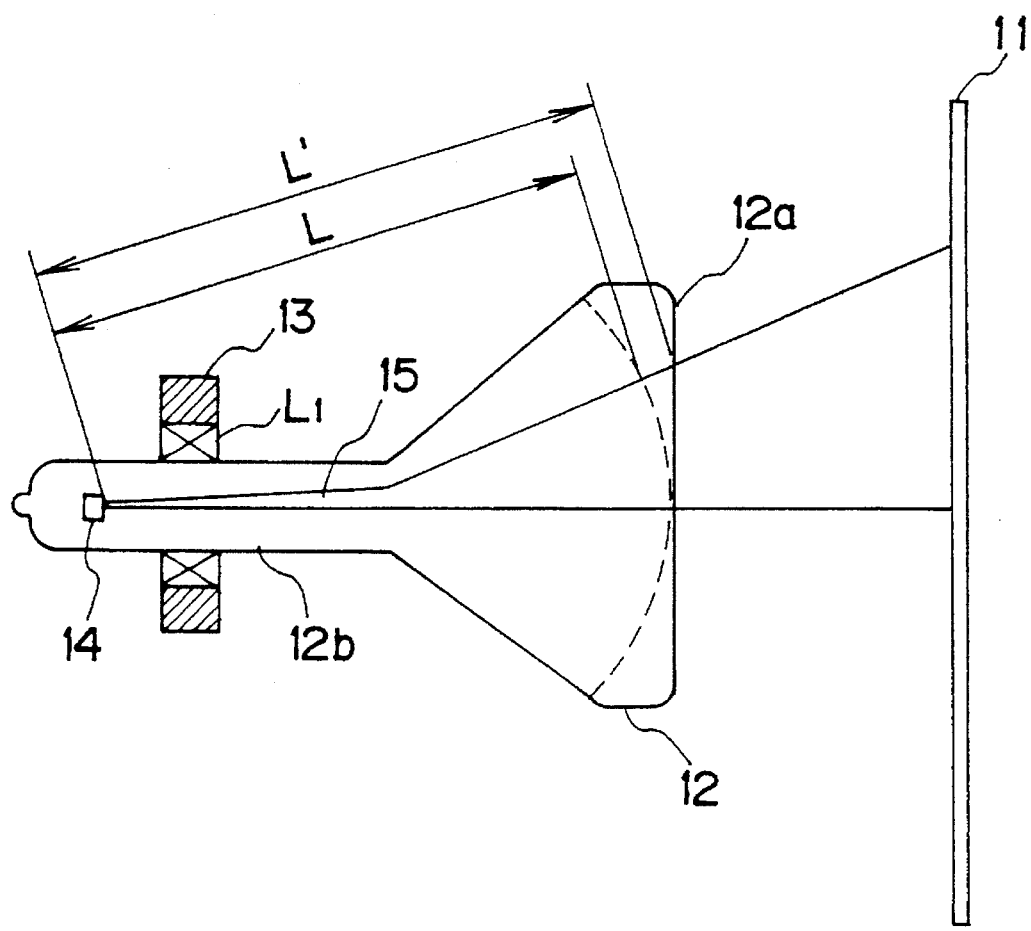
FIG. 7 is a cross sectional view of a CRT of an electromagnetic focusing type.
Figure 8A:
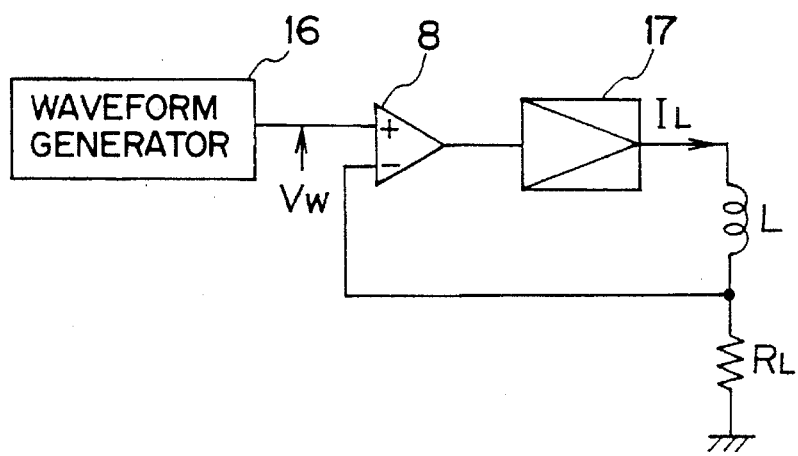
FIG. 8a and FIG. 8b, are diagrams for explaining a focusing operation by a focus coil driving circuit using a constant current amplifier according to the related art.
Figure 8B:
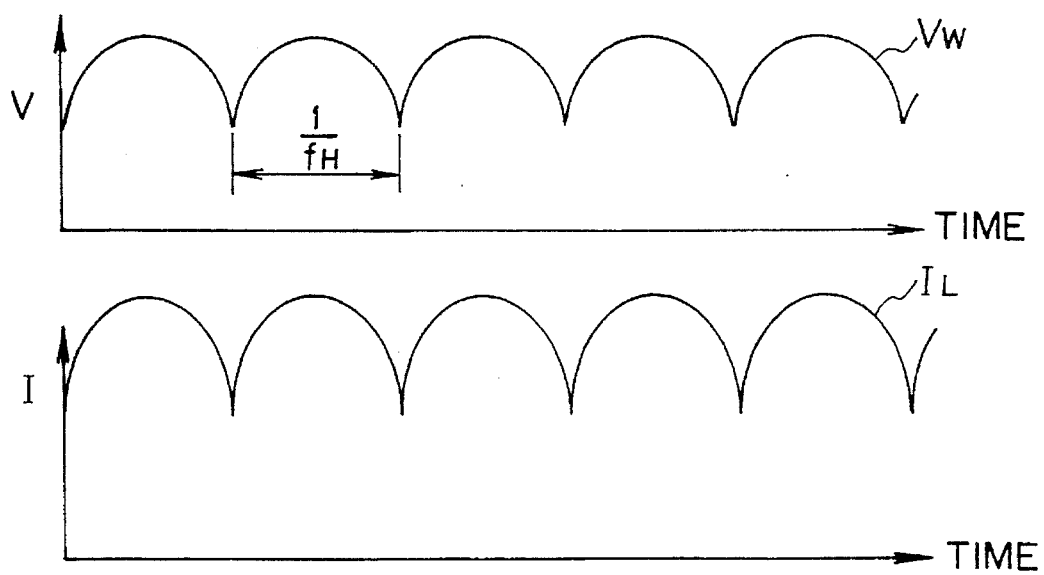
Figure 9A:
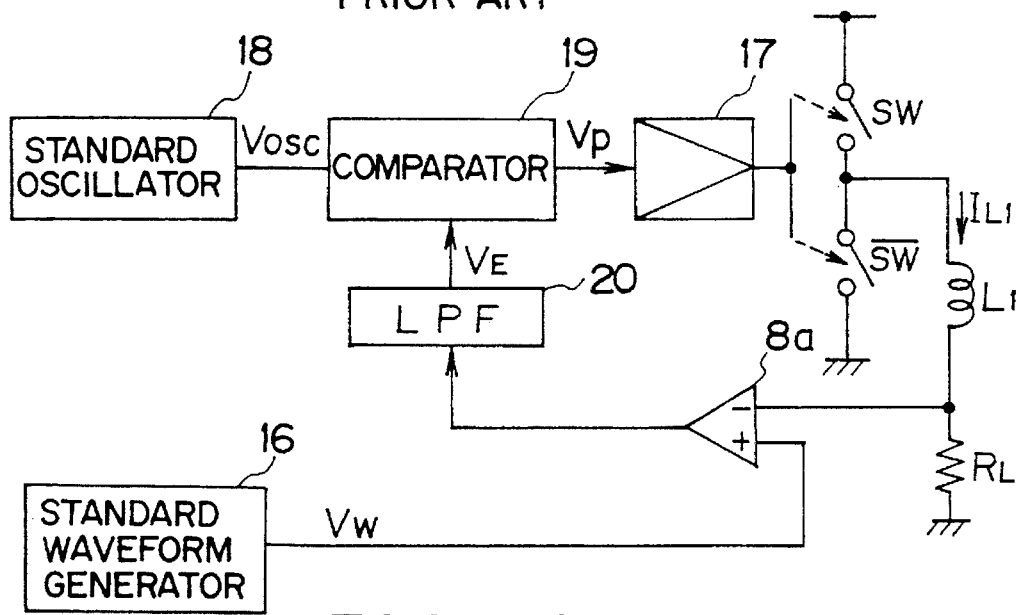
FIG. 9a and FIG. 9b, are diagrams for explaining a focusing operation by a focus coil driving circuit by means of PWM method according to the related art.
Figure 9B:
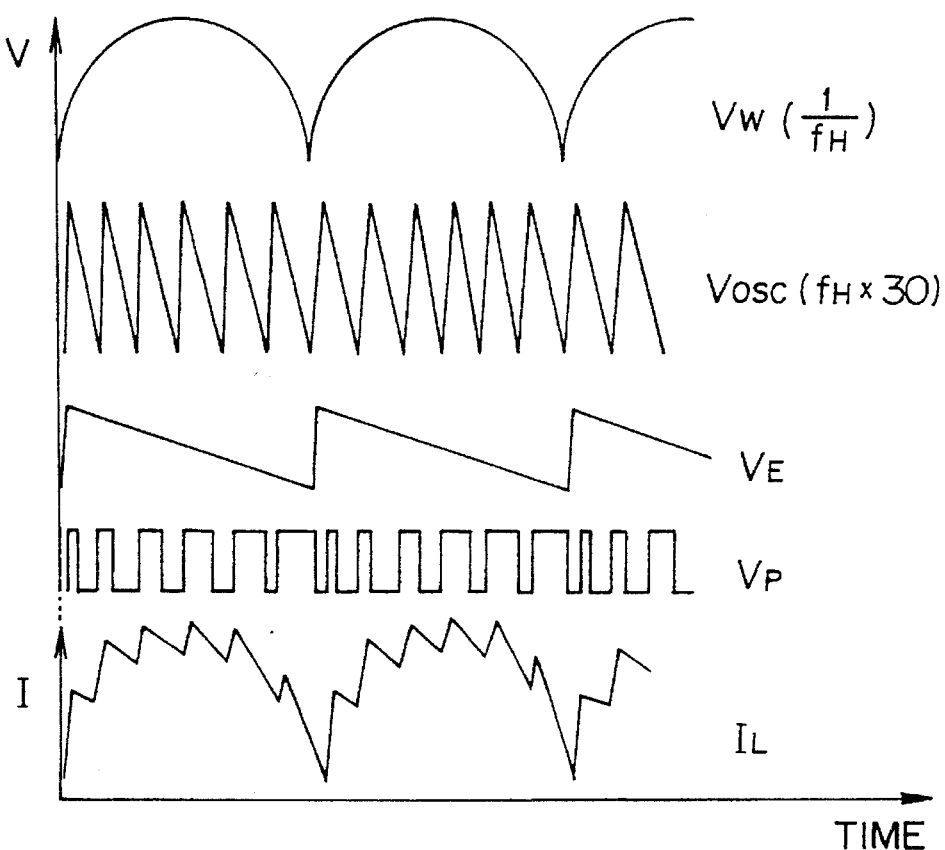

Nextly, the operation of the second embodiment is explained on the basis of FIG. 6.

It is assumed that the transistor Q for modulating the electric source is in the ON condition. The video signal Si, which includes the horizontal synchronizing signal, is clamped inside of the horizontal synchronization separating circuit 1, and is PLL-locked, so that the horizontal synchronizing signal S1 is picked up, as indicated by a curve 201 of FIG. 6. This pulse in the signal S1 is converted by the pulse width converting circuit 21 to be in a "L" condition during the horizontal synchronization blanking time period (retrace line time period) which is about 4 μsec. The timing control circuit 2 generates the switching pulses S2 and S3 (as indicated by curves 202 and 203 of FIG. 6) to input to the thyristors on the basis of the horizontal blanking time period. The switching timing for the first oscillating circuit and the switching timing for the second oscillating circuit have an opposing relationship i.e. have an inverse logic to each other. Thus, those switching pulses S2 and S3 for the thyristors SCR1 and SCR 2 are generated to have the polarity reverse to each other and the input timings are matched to each other. Those switching pulses S2 and S3 are supplied to the thyristor drivers 3 and 4 respectively, and are formed into the switching differential pulses respectively to be applied to the thyristors SCR1 and SCR2.

Firstly, at the time t1, the switching pulse S2 is set to be the ON condition for the thyristor SCR1, and the switching pulse S3 for the thyristor SCR2 is set to be in the OFF condition. Thus, only the fist oscillating circuit is effected. Accordingly, the current $i_{L1}$ is flowing through the closed loop, and the charging to the capacitor C is started. Accompanied to this charging process, the potential vc of the capacitor C is increased by a sine characteristic, begins to be positive, and arrives at its peak value (at the time t2), as indicated by a curve 204 of FIG. 6. The change from the negative potential to the positive potential is as much as about 530 Vp-p (peak to peak voltage).

Nextly, the switching pulse S2 is set to be in the OFF condition at the time t2 (as indicated by the curve 202), so that the thyristor SCR1 receives a negative trigger pulse to be in a non-conductive condition. Thus, the closed loop of the first oscillating circuit is cut. At the same time, the switching pulse S3 is set to be in the ON condition (as indicated by the curve 203), so that the thyristor SCR2 receives the positive trigger pulse to be in the conductive condition. Thus, the second oscillating circuit becomes in a closed loop condition. The capacitor C starts discharging with drawing the sine characteristic curve by the time constant of the second oscillating circuit (as indicated by the curve 204), and the current $i_{L2}$ of the second oscillating circuit starts increasing. At the vicinity of the center of the video signal time period i.e. at the time t3, the current $i_{L2}$ arrives at its peak value, and the capacitor C has completely discharged, and the potential is reversed. Then, as the current $i_{L2}$ for the coil L2 is reduced, the capacitor C is charged with the negative electric charge. At the negative voltage peak (at the time t4), the current $i_{L2}$ becomes zero in the closed loop, and charging is completed. The current $i_{L2}$ for the second oscillating circuit becomes a control current for the focus coil L2.

This current $i_{L2}$ has a half wave cycle of the sine wave as understood from FIG. 6. Thus, if the current value at the peak point (at the time t3) can be set, the changing characteristic can be uniquely determined by the time constant of the oscillating circuit. The output of the error circuit 8 which constitutes the negative feed back loop circuit, determines this peak current value.

The negative feed back loop functions to stabilize the potential of the pseudo parabola wave. Firstly, since the detection resistor RL is inserted in series in the oscillating circuit, the voltage is generated which corresponds to the current $i_{L2}$ of the closed loop. The peak detecting and holding circuit 7 samples the voltage value at the peak of this voltage (at the time t3), and hold it. Namely, the peak value of the current $i_{L2}$ of FIG. 6 is held. This held value is inputted to the error amplifier 8 through the input resistor R2. If this peak voltage becomes higher than the standard voltage Vref, the error amplifier 8 outputs an negative output and controls the transistor Q to become in the non-conductive condition, so that the electric power supply to the fist oscillating circuit is reduced. When the both ends voltage of the capacitor Ci as the source voltage, is reduced, the charging voltage for the capacitor C is reduced (at the time t4 in the curve 204), and the current $i_{L2}$ is also reduced. Thus, the voltage difference appeared on the both ends of the detection resistor RL is made constant at the value where the output of the peak detecting and holding circuit 7 and the standard voltage Vref are coincident to each other. Therefore, the comparison output of the error amplifier 8 is inverted to control the ON resistor of the transistor Q so that the predetermined coil current is kept to be supplied. Thus, even if there arises a change in the environment as for temperature, humidity etc., the current value for focusing is kept constant by virtue of the negative feed back loop. On the other hand, a control input to finely adjust the error in the necessary current value for focusing due to the high and low of the horizontal scanning frequency at the multi-scanning, is supplied to the error amplifier 8 from the F/V converting circuit 5 through the input resistor R1, together with the output voltage of the peak detecting and holding circuit 7.

In case of multi-scanning, when the scanning frequency of the system is changed, the change in the voltage value is caused by the F/V converting circuit 5. Here, if the inductance of the coil L3 is changed in accordance with the characteristic of this change, by the control of the control current by use of the inductance controlling circuit 6, the oscillating frequency is also changed. Thus, the inductance value of the coil L3 is set to obtain an appropriate time constant, such that the switching timing comes at the peak position of this sine wave characteristic.

The smoothing capacitor Ci is a capacitor to by-pass the oscillating current of the first oscillating circuit. To the smoothing capacitor Ci, the voltage is supplied from the voltage source Vi through the collector-emitter resistor of the transistor Q. The capacitor Ci stabilizes the supplied voltage. In this manner, the capacitor Ci is a capacitor for by-passing and smoothing. Each of the snubber circuits 9 and 10, which are connected to the coil L1 and the coils 2 and 3 in parallel respectively, functions as a shock-absorber to prevent the erroneous operation of the thyristor due to the differential electric current generated at the moment of switching. Each of the snubber circuits 9 and 10 is a time constant circuit including a capacitor and a resistor for preventing the rising-up of the surge voltage which is much higher than the necessary frequency.

According to the second embodiment, the switching operation can be performed by the thyristor which is suitable for switching in a high voltage circumstance, and the dynamic focus circuit can be constructed by use of a simple construction. Since it is only necessary to change the control characteristic of each of the controlling circuits in accordance with the horizontal synchronization signal, the circuit construction can be made simplified and the cost thereof can be reduced. Since the switching pulse is synchronized with the horizontal synchronizing signal, there is little possibility to generate a noise having a new frequency range as in the aforementioned conventional case, so that the countermeasure for the unnecessary irradiation can be easily performed.

By performing the inductance control of the saturable inductor of the coil L3 and the current servo-control of the negative feed back circuit by use of the F/V converting circuit, the present embodiment can be easily applied to the multi-sync display in which the horizontal scanning frequency $f_H$ is changed.

Further in the above explained second embodiment, the horizontal scanning blanking time period is set to be the constant value i.e. about 4 [μsec]. However, this blanking time period may, off course, be varied per every horizontal scanning frequency. For example, since the blanking time period in one horizontal synchronizing time period of 63.5 [μsec] of the NTSC (National Television Systems Committee) method, is 11.4 [μsec], it is preferred to set the SCR1 in the ON condition during the period close to this blanking time period, and to control the operation of the pulse width converting circuit 21 in correspondence with the horizontal scanning time period at that time. For example, if the pulse width converting circuit 21 has the CR (Capacitor-Resistor) time constant circuit, the resistance of the circuit may be changed.

Other Modified Embodiment

In the above mentioned second embodiment, the video signal input is used for the standard signal. However, switching control may be performed by directly inputting a horizontal blanking signal, a composite blanking signal etc., from a sync generation block. Further, a horizontal synchronizing pulse, which is synchronized with the horizontal synchronizing frequency and is generated from a FBT (Fly Back Trance) circuit for generating a high voltage, may be used instead. In this case, the horizontal synchronization separating circuit 1 of FIG. 5, is not necessary.

The thyristor is used as a switching element in the above embodiment. However, a switching element which can perform a switching operation with a short switching time, can be used instead. For example, a FET (Field Effect Transistor), a transistor, a relay diode etc., may be used.

As for the available standard, the present embodiment can be applied to not only the television system standard, but also any standard just by changing the design of the time constant. Namely, the present embodiment can be adapted to a television standard other than the NTSC method, such as the PAL (Phase Alteration Line) method, the SECAM (Sequential And Memory) method, and so on, by changing the time constant of the pulse width converting circuit to the pulse width of the horizontal synchronizing blanking time period of the relevant television method.

As described above in detail, according to the present embodiments, by use of a simple circuit which requires no special output circuit such as an output amplifier, the dynamic focusing operation can be realized, and the cost can be reduced. Further, since the elements which consume the electric power are reduced, and only the trigger electric power for the switching elements are substantially only needed, the overall electric power consumption is very small. For example, in the operation of $f_H$=33.75 [kHz], the electric power source voltage=25 [V], and the electric power consumption=14 [Watt] are obtained.

Furthermore, since the switching operation is performed by the original horizontal scanning frequency, there is little possibility that noises having unnecessary frequencies, and the unwilling influence to other circuits due to the beat and unnecessary irradiation can be diminished.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A dynamic focus circuit of electromagnetic focusing type for a cathode ray tube of a video image displaying apparatus, said dynamic focus circuit comprising a first oscillating circuit and a second oscillating circuit, said first oscillating circuit comprising: an electric power source; a first switching means; and a capacitor, which are connected in series to form a loop, said first oscillating circuit being opened and closed by said first switching means, said second oscillating circuit comprising: a second switching means; said capacitor, which is commonly used with said first oscillating circuit such that said first and second oscillating circuits are parallel with respect to said capacitor; and a focus coil for focusing an electron beam of said cathode ray tube, said second switching means, said capacitor and said focus coil being connected in series to form a loop, said second oscillating circuit being opened and closed by said second switching means, said first switching means opening and closing at a timing in correspondence with a blanking time period or a video image time period based on a horizontal scanning frequency of video image data of said video image displaying apparatus, to charge and discharge said capacitor, said second switching means opening and closing at a timing according to an inverse logic of said first switching means, to charge and discharge said capacitor.

2. A dynamic focus circuit according to claim 1, wherein said first oscillating circuit further comprises a first coil for generating an oscillation in said first oscillating circuit.

3. A dynamic focus circuit according to claim 2 further comprising a snubber circuit connected in parallel with said first coil.

4. A dynamic focus circuit according to claim 1, wherein said first switching means comprises a first thyristor, and said second switching means comprises a second thyristor.

5. A dynamic focus circuit according to claim 4, further comprising a timing control circuit for controlling a switching timing of said first thyristor and a switching timing of said second thyristor.

6. A dynamic focus circuit according to claim 1, further comprising a horizontal synchronization separating means for separating a horizontal synchronizing signal from the video image data of said video image displaying apparatus, said first and second switching means opening and closing on the basis of the separated horizontal synchronizing signal.

7. A dynamic focus circuit according to claim 1, wherein said second oscillating circuit further comprises a second coil for generating an oscillation in said second oscillating circuit.

8. A dynamic focus circuit according to claim 7, wherein said second coil comprises a saturable inductor, and changes an oscillating frequency in said second oscillating circuit by changing an inductance of said saturable inductor.

9. A dynamic focus circuit according to claim 8, further comprising a F/V (Frequency to Voltage) convertor for converting the horizontal synchronizing frequency to a voltage signal for controlling said saturable inductor.

10. A dynamic focus circuit according to claim 7 further comprising a snubber circuit connected in parallel with said second coil.

11. A dynamic focus circuit according to claim 1 further comprising:

a transistor connected in series in the loop of said first oscillating circuit, for controlling a voltage supplied by said electric power source; and a negative feed back loop for negatively feed back a portion of an oscillating current of said focus coil to said first oscillating circuit to stabilize the oscillating current of said focus coil.

12. A dynamic focus circuit according to claim 1, wherein said first oscillating circuit further comprises a smoothing capacitor for bypassing an oscillating current of said first oscillating circuit.

* * * * *